Dec. 9, 1924.　　　　　　　　　　　1,518,880
H. STREMPEL
DRAFT EQUALIZER
Filed Jan. 14, 1924
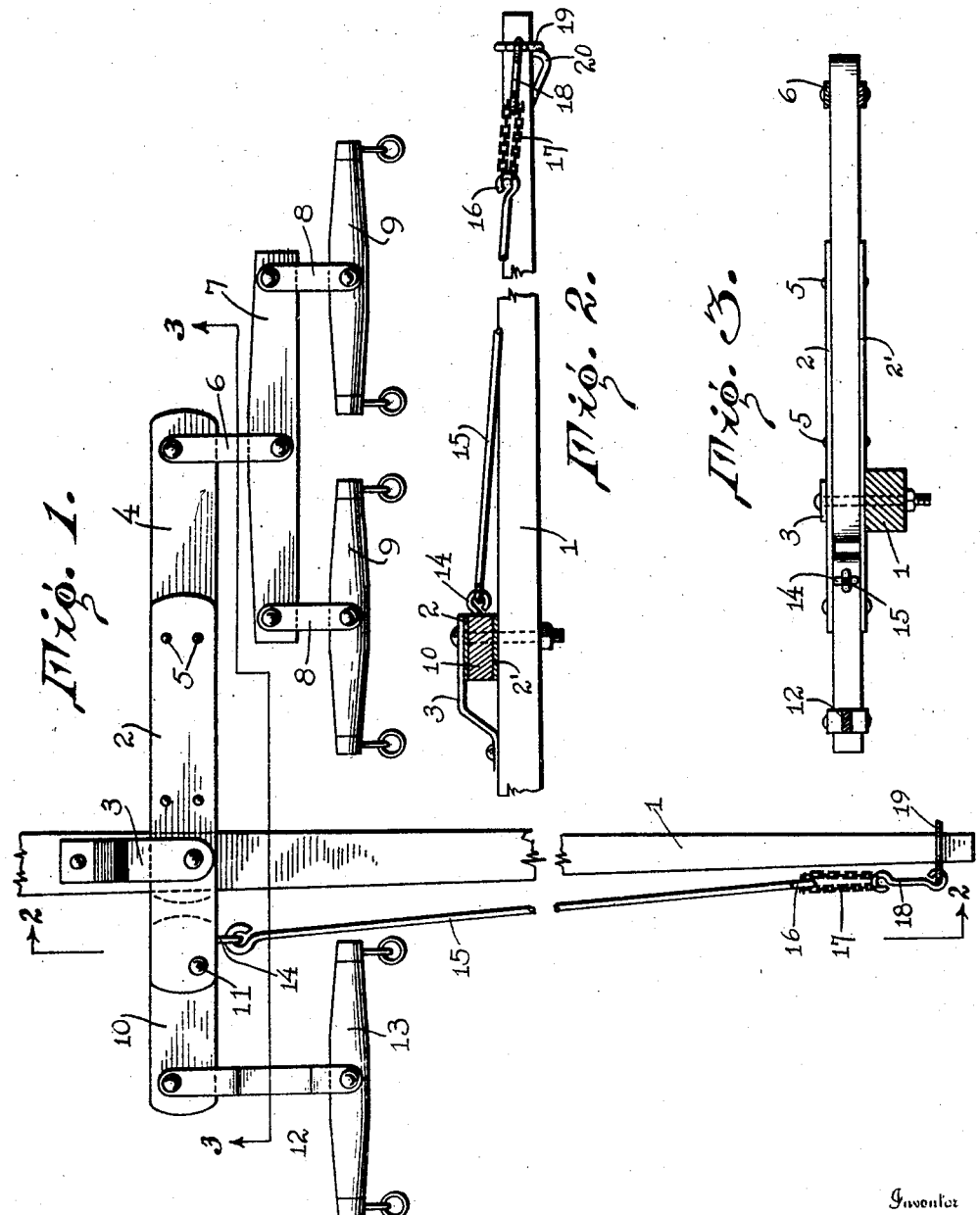
Hugo Strempel, Inventor
By Jacobi & Jacobi, Attorneys Patented Dec. 9, 1924.

1,518,880

UNITED STATES PATENT OFFICE.

HUGO STREMPEL, OF RICHMOND, TEXAS.

DRAFT EQUALIZER.

Application filed January 14, 1924. Serial No. 686,099.

*To all whom it may concern:*

Be it known that HUGO STREMPEL, a citizen of the United States, residing at Richmond, in the county of Fort Bend and State of Texas, has invented certain new and useful Improvements in Draft Equalizers, of which the following is a specification.

This invention relates to a new and useful improvement in draft equalizers, and has for its principal object to provide a simple and efficient means for distributing the pull of a number of horses equally between them and preventing the side draft of the wagon pole.

Another important object of the invention is to provide a draft equalizer of the above mentioned character wherein means is provided for enabling three horses to be hitched in such a manner as to provide for the work substantially equal between each of the horses.

A still further object of the invention is to provide a draft equalizer of the above mentioned character, which is simple in construction, inexpensive, strong and durable and further well adapted for the purposes for which it is designated.

Other objects and advantages of this invention will become apparent during the course of the following description.

In the accompanying drawing forming a part of this specification and in which like numerals of reference designate like parts throughout the same,—

Figure 1 is a top plan view of my improved draft equalizer.

Figure 2 is a longitudinal section taken on line 2—2 of Fig. 1, and

Figure 3 is a transverse section taken on line 3—3 of Fig. 1.

In the drawing wherein for the purpose of illustration is shown the preferred embodiment of my invention, the numeral 1 designates the wagon tongue or draft pole and extending transversely thereon and pivotally secured thereto is the equalizer beam 2, which comprises the spaced plates 2 and 2' and an arm 4 to which said plates are secured. The beam 2 is pivotally supported in the bracket 3 and is preferably pivoted intermediate its ends for the purpose to be hereinafter more fully described.

The plates 2 and 2' are secured on opposite faces of the arm 4 in any preferred manner such as shown at 5, so that said arm extends to one side of the pole 1. Secured to the outer end of the arm 4 is the link 6 and pivotally supported in the forwardly extending portion of the link 6 is the doubletree 7. Suitable links such as are shown at 8 in the drawing, are carried by the outer ends of the doubletree 7 to pivotally support the swingle trees 9. As the doubletree and swingle trees are well known in the art further description of the same is not thought necessary, as the same forms no important part of the present invention.

Pivotally supported between the plates 2 and 2' at the opposite end of the equalizer beam 2 on the opposite side of the draft pole 1, is a shorter arm 10. This arm 10 is preferably pivotally supported on the outer end of the equalizer beam adjacent the inner end of the arm as is more clearly illustrated at 11 in the drawing. The outer end of the shorter arm 10 carries the link 12 which is similar to the link 6, and pivotally supported in the forward end of the link 12 is the swingle tree 13.

Secured to the forward portion of the inner end of the shorter arm 10 by any suitable fastening means such as is shown at 14 in the drawing, is one end of the elongated rod 15. The opposite end of the rod has a loop 16 formed thereon and a suitable chain or the like such as is clearly illustrated at 17 in the drawing, is adapted to extend through the loop 16, the opposite end of the chain 17 carrying the link 18 for engagement with the ring member 19, the latter being movably supported on the free end of the draft pole 1 and having a stop member 20 cooperating therewith for limiting the rearward movement of the rod 15 and the movement of the short arm 10 to which the same is connected. The loop 16 is in the form of a hook and this construction permits the chain 17 to be taken up in accordance with the weight of the load to assist in carrying out the purposes for which the evener is designed. The main function of the rod 15 is to act as an equalizer to produce a reaction to the pull of the horse connected at 13 so that said reaction, added to the pull of the one horse, counterbalances the pull of the two horses at 9.

With the parts arranged as shown in Fig. 1 of the drawing, one horse is adapted to be placed on one side of the draft pole 1 and hitched to the swingle tree 13, while two horses are hitched to the swingle trees 9 mounted on the double tree 7 on the opposite side of the draft pole 1. By the arrangement of the various arms and the rod 15, the pull of each of the horses will be equalized, as will be obvious from the construction shown and described.

With a device of the above mentioned character, three horses may be used in such a manner as to equally distribute the pull and furthermore, means is provided for preventing the excessive load on one of the horses thus insuring an equal distribution of pull amongst all of the horses.

The simplicity of my device enables the same to be manufactured at a minimum cost and does not require a number of complicated parts in order to carry out the purposes of the present invention.

From the foregoing description of the construction of my improved apparatus, it will be seen that I have provided a simple inexpensive and efficient means for carrying out the objects of the invention, and while I have particularly described the elements best adapted to perform the functions set forth, it is obvious that various changes in form, proportion, and in the minor details of construction may be resorted to, without departing from the spirit or sacrificing any of the principles of the invention.

Having thus described my invention what I claim is:

In a draft equalizer of the class described, comprising in combination, a draft pole, an equalizer beam pivoted intermediate its ends on said pole and extending transversely thereto, a doubletree carried at one end thereof, an arm pivoted on the opposite end of said beam, a swingletree carried thereby, a ring on the forward end of said draft pole, and a rod connected to said ring and said arm respectively to assist the pull applied to the singletree in counterbalancing the pull applied to the doubletree.

In testimony whereof I affix my signature.

HUGO STREMPEL.